(12) United States Patent
Yamada

(10) Patent No.: US 10,171,464 B2
(45) Date of Patent: Jan. 1, 2019

(54) DATA PROCESS APPARATUS, DATA SHARING METHOD, AND DATA PROCESS SYSTEM

(71) Applicant: Kazuhiro Yamada, Kanagawa (JP)

(72) Inventor: Kazuhiro Yamada, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 256 days.

(21) Appl. No.: 15/062,394

(22) Filed: Mar. 7, 2016

(65) Prior Publication Data

US 2016/0277401 A1 Sep. 22, 2016

(30) Foreign Application Priority Data

Mar. 19, 2015 (JP) .................................. 2015-056206

(51) Int. Cl.
| | |
|---|---|
| *H04L 29/06* | (2006.01) |
| *G06F 21/62* | (2013.01) |
| *H04L 29/08* | (2006.01) |
| *G06F 21/31* | (2013.01) |
| *G06F 21/36* | (2013.01) |

(52) U.S. Cl.
CPC .......... *H04L 63/0876* (2013.01); *G06F 21/31* (2013.01); *G06F 21/36* (2013.01); *G06F 21/6218* (2013.01); *H04L 67/1097* (2013.01)

(58) Field of Classification Search
CPC ...... G06F 15/16; G06F 21/31; G06F 21/6218; G06F 17/00; G06F 12/00; G06F 21/34; G06F 21/36; G06F 21/60; G06F 21/00; H04L 63/0876; H04L 67/1097; H04L 9/32; H04L 9/3226; H04W 12/06

USPC ................. 707/646, E17.007; 709/204, 209; 711/151, E12.001; 713/153; 714/E11.188, 48, E11.149; 726/1–4, 2, 7

See application file for complete search history.

(56) References Cited

U.S. PATENT DOCUMENTS

| | | | |
|---|---|---|---|
| 7,529,549 | B2 | 5/2009 | Yamada et al. |
| 7,849,305 | B2 * | 12/2010 | Leoutsarakos .......... H04L 63/08 709/209 |

(Continued)

FOREIGN PATENT DOCUMENTS

| | | |
|---|---|---|
| JP | 5074660 | 11/2012 |
| JP | 2013-228809 | 11/2013 |
| JP | 2014-078220 | 5/2014 |

*Primary Examiner* — Thanhnga B Truong
(74) *Attorney, Agent, or Firm* — IPUSA, PLLC

(57) ABSTRACT

A data process apparatus includes a management unit that receives a creation request for creating a sharable data storage space from an unauthenticated data terminal and transmit a response to the unauthenticated data terminal, an authentication unit that authenticates the access data when the data process apparatus receives an access request including a designation of the access data for accessing the shared data storage space from an unauthenticated data terminal connected to a same network as the data process apparatus, a request processing unit that receives the access request from the unauthenticated data terminal when the authentication of the access data succeeds and perform a predetermined process in accordance with the access request. The response includes access data indicating authorization for accessing the sharable data storage space and data indicating the sharable data storage created in association with the access data.

13 Claims, 14 Drawing Sheets

(56) References Cited

U.S. PATENT DOCUMENTS

| | | |
|---|---|---|
| 7,869,082 B2 | 1/2011 | Hayashida et al. |
| 9,053,126 B2 | 6/2015 | Yamada |
| 9,164,713 B2 | 10/2015 | Yamada |
| 9,350,900 B2 * | 5/2016 | Yasuhara ................. G06F 21/41 |
| 9,407,611 B2 * | 8/2016 | Kato ..................... H04L 63/062 |
| 2008/0250507 A1 | 10/2008 | Yoshida |
| 2009/0182811 A1 * | 7/2009 | Sugawara ........... G06F 17/3015 |
| | | 709/204 |
| 2009/0254713 A1 * | 10/2009 | Jeong ................. G06F 13/1605 |
| | | 711/151 |
| 2011/0178987 A1 * | 7/2011 | Choi ................... G06F 11/1456 |
| | | 707/646 |
| 2013/0027726 A1 | 1/2013 | Yamada |
| 2013/0291081 A1 * | 10/2013 | Mechaley, Jr. ....... H04W 12/06 |
| | | 726/7 |
| 2014/0016161 A1 | 1/2014 | Yamada |
| 2014/0016816 A1 | 1/2014 | Yamada |
| 2014/0082139 A1 | 3/2014 | Shimomoto |
| 2015/0080025 A1 | 3/2015 | Yamada |
| 2015/0082423 A1 | 3/2015 | Yamada |
| 2015/0249724 A1 | 9/2015 | Yamada |

* cited by examiner

DATA PROCESS APPARATUS, DATA SHARING METHOD, AND DATA PROCESS SYSTEM

BACKGROUND OF THE INVENTION

1. Field of the Invention

The present invention relates to a data process apparatus, a data sharing method, and a data process system.

2. Description of the Related Art

In order to prevent problems such as data leakage and computer virus infection in a local network connected to various office machines (e.g., printers) and file servers, a mechanism such as prohibiting the connection of unregistered data terminals is commonly used for preventing unauthorized access.

For example, Japanese Laid-Open Patent Publication No. 2014-78220 discloses a data process system that allows a user of a mobile device (e.g., smartphone) connected to an external network to operate an electronic device in cooperation with a file server provided in a network different from the external network.

In some cases, a user may desire sharing data with another user by using a data process apparatus connected to a network of an outside facility (e.g., rental office). However, the data process apparatus connected to the network of the outside facility may require user registration and device registration in order to use the data process apparatus. Therefore, the user and other users cannot use the data process apparatus with their terminal devices unless they have completed user registration and device registration.

SUMMARY OF THE INVENTION

The present invention provides a data process apparatus, a data sharing method, and a data process system that substantially obviates one or more of the problems caused by the limitations and disadvantages of the related art.

Features and advantages of the present invention are set forth in the description which follows, and in part will become apparent from the description and the accompanying drawings, or may be learned by practice of the invention according to the teachings provided in the description. Objects as well as other features and advantages of the present invention will be realized and attained by a data process apparatus, a data sharing method, and a data process system particularly pointed out in the specification in such full, clear, concise, and exact terms as to enable a person having ordinary skill in the art to practice the invention.

To achieve these and other advantages and in accordance with the purpose of the invention, as embodied and broadly described herein, an embodiment of the present invention provides a data process apparatus including a management unit that receives a creation request for creating a sharable data storage space from an unauthenticated data terminal and transmit a response to the unauthenticated data terminal, an authentication unit that authenticates the access data when the data process apparatus receives an access request including a designation of the access data for accessing the shared data storage space from an unauthenticated data terminal connected to a same network as the data process apparatus, a request processing unit that receives the access request from the unauthenticated data terminal when the authentication of the access data succeeds and perform a predetermined process in accordance with the access request. The response includes access data indicating authorization for accessing the sharable data storage space and data indicating the sharable data storage created in association with the access data.

Other objects, features and advantages of the present invention will become more apparent from the following detailed description when read in conjunction with the accompanying drawings.

DETAILED DESCRIPTION OF THE PREFERRED EMBODIMENTS

Next, embodiments of the present invention are described.

First Embodiment

Figure 1:
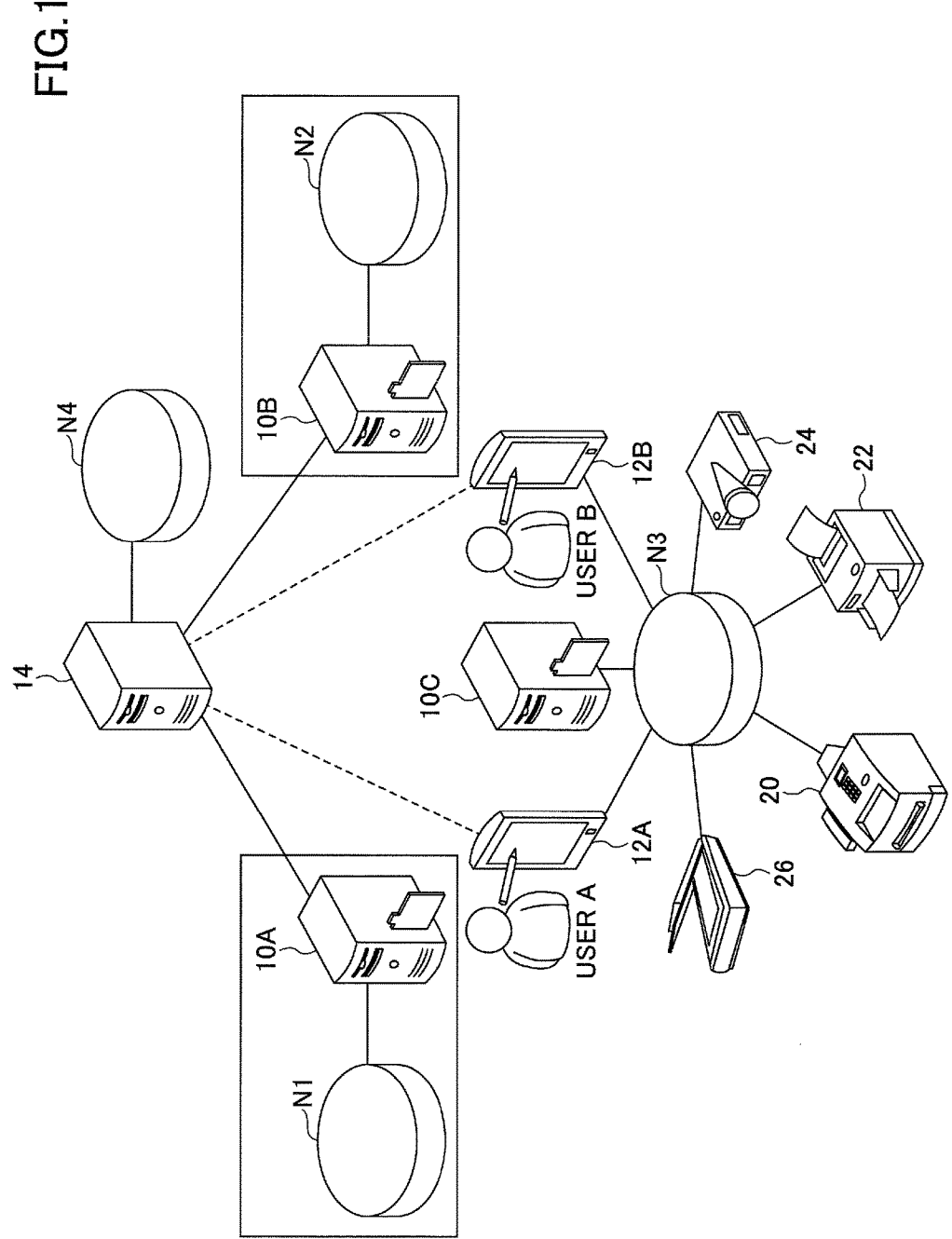
FIG. 1 is a schematic diagram illustrating an example of a data process system according to an embodiment of the present invention.

<System Configuration>
FIG. 1 is a schematic diagram illustrating an example of a data process system according to an embodiment of the present invention. The data process system 1 of FIG. 1 includes networks N1 to N3. The networks N1 to N3 are local networks such as a cabled LAN (Local Area Network)

or a wireless LAN. The networks N1 to N3 enable communication between different devices.

The network N1 of FIG. 1 is connected to a data process apparatus 10A. Various devices such as a multifunction peripheral, a printer, a projector, and a scanner may be connected to the network N1. The data process apparatus 10A includes a function of a file server capable of obtaining files from other devices and retaining the obtained files.

The network N2 of FIG. 1 is connected to a data process apparatus 10B. Various devices such as a multifunction peripheral, a printer, a projector, and a scanner may be connected to the network N2. The data process apparatus 10B includes a function of a file server capable of obtaining files from other devices and retaining the obtained files.

The network N3 of FIG. 1 is connected to a data process apparatus 10C, data terminals 12A, 12B, a multifunction peripheral 20, a printer 22, a projector 24, and a scanner 26. The data process apparatus 10C connects with various devices such as the data terminals 12A, 12B, the multifunction peripheral 20, the printer 22, the projector 24, and the scanner 26 by way of the network N3. The data process apparatus 10C includes a function of a file server capable of obtaining files from other devices and retaining the obtained files.

The relay server 14 is placed on a network N4 such as the Internet. The data terminals 12A, 12B can connect with the relay server 14 placed on the network such as the Internet by using a telephone line such as a 3G line. The data process apparatuses 10A, 10B can also connect with the relay server 14. Note that the data process apparatus 10C cannot connect with the relay server 14 because the data process apparatus 10C is not connected to the network N4 such as the Internet. The data terminals 12A, 12B located outside the networks N1, N2 cannot directly access the data process apparatuses 10A, 10B and can only communicate with the data process apparatuses 10A, 10B by way of the relay server 14.

Note that the relay server 14 provided on the network such as the Internet may be omitted in a case where the data terminals 12A, 12B can directly connect with the data process apparatuses 10A, 10B by way of the network such as the Internet.

The multifunction peripheral 20 is an example of an image process apparatus including a combination of functions such as a copier function, a printer function, a scanner function, and a facsimile function. The multifunction peripheral 20 can print a file stored in the data process apparatus 10C by way of the network N3. The multifunction peripheral 20 can read image data from a document by using the scanner function and store the image data in the image process apparatus 10C by way of the network N3. The printer 22 is an example of an image process apparatus including a printing function. The printer 22 can print a file stored in the data process apparatus 10C by way of the network N3.

The projector 24 is an example of an image projecting apparatus capable of projecting an image or the like on a screen. The projector 24 obtains a file stored in the data process apparatus 10C by way of the network N3 and projects the obtained file. An IWB (Interactive White Board) may be connected to the network N3.

The scanner 26 is an example of an image reading apparatus that reads an image from a document and converts the read image into image data. The scanner 26 can retain the image data read from the document in the data process apparatus 10C by way of the network N3. Note that a device other than the devices illustrated in FIG. 1 may also qualify as a device of this embodiment as long as the device can connect with the network N3 and handle typical image file formats.

The data terminals 12A, 12B are examples of terminal devices operated by the user. The data terminals 12A, 12B may be, for example, a smart device or a personal computer (PC). In a case where the data terminals 12A, 12B are authenticated by the data process apparatuses 10A, 10B, the authenticated data terminals 12A, 12B can store files in the data process apparatuses 10A, 10B and browse the files stored in the data process apparatuses 10A, 10B.

The data terminals 12A, 12B authenticated by the data process apparatuses 10A, 10B can access various devices connected to the networks N1, N2 by way of the data process apparatuses 10A, 10B. Note that the data terminals 12A, 12B access the data process apparatus 10C in a below-described manner and share files by using a shared folder.

The relay server 14 has a function of receiving requests from the data terminals 12A, 12B and transferring the requests to the data process apparatus 10A or the data process apparatus 10B. Because the relay server 14 cannot directly access the data process apparatus 10A or the data process apparatus 10B, the relay server 14 transfers the requests to the data process apparatus 10A or the data process apparatus 10B in the form a response to a request inquiry from the data process apparatus 10A or the data process apparatus 10B.

<Network Configuration>

Figure 2:
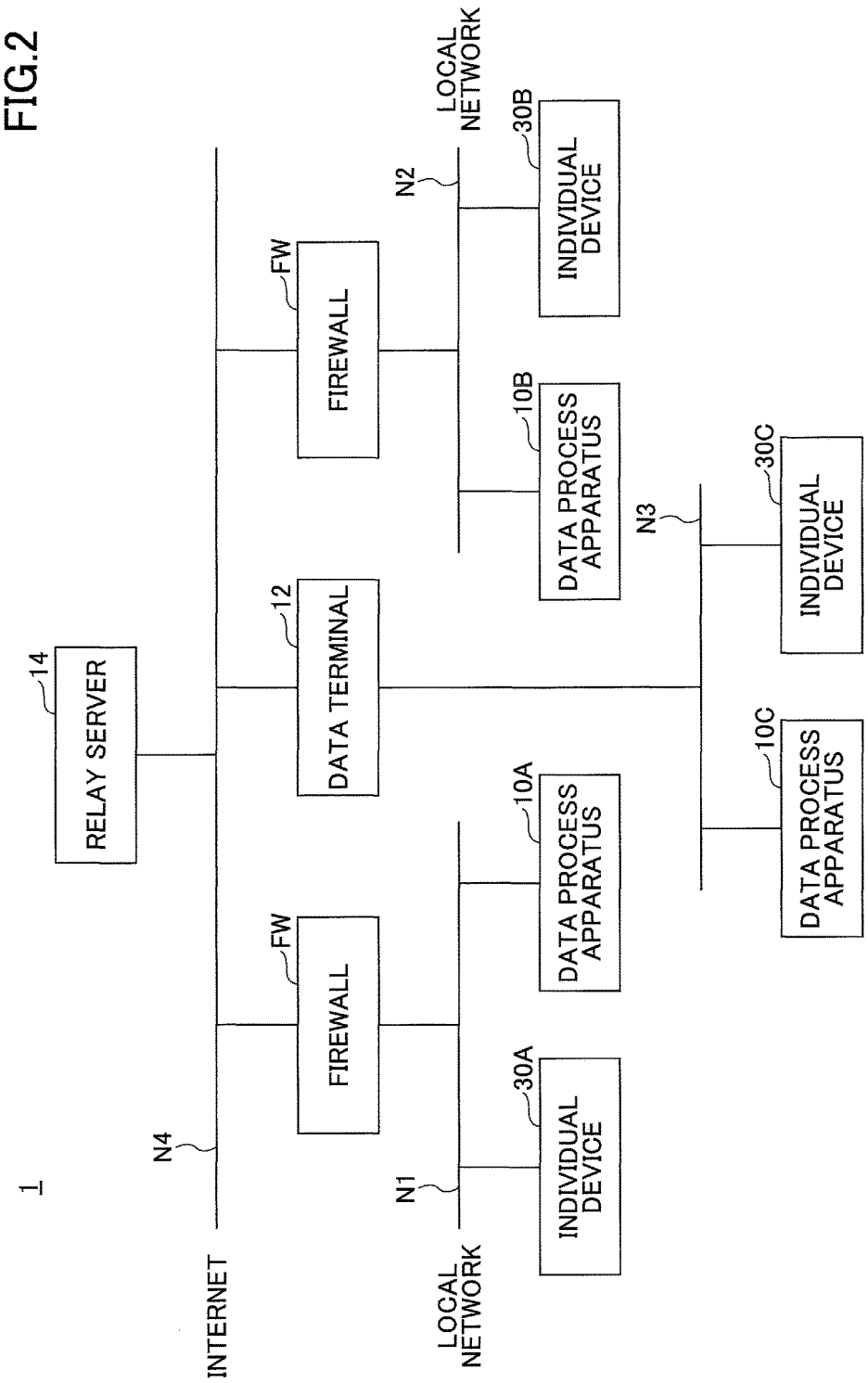
FIG. 2 is a schematic diagram illustrating an example of a data process system according to an embodiment of the present invention.

FIG. 2 is a schematic diagram illustrating an example of a data process system 1 according to an embodiment of the present invention. In the data process system 1 of FIG. 2, the data terminal 12 and the relay server 14 are connected to the network N4 such as a public network (e.g., Internet). Thereby, the data terminal 12 and the relay server 14 can communicate with each other by way of the network N4. Note that the data terminals 12A, 12B of FIG. 1 are collectively referred to as the data terminal 12 in FIG. 2.

The data process apparatus 10A and various devices (individual devices) 30A such as the multifunction peripheral are connected to the network N1 such as a local network provided inside the firewall FW. Thereby, the data process apparatus 10A and the individual device 30A can communicate with each other by way of the network N1. The data process apparatus 10B and various devices (individual devices) 30B such as the multifunction peripheral are connected to the network N2 such as a local network provided inside the firewall FW. Thereby, the data process apparatus 10B and the individual device 30B can communicate with each other by way of the network N2.

The data terminal 12 is connected to the network N3 such as a local network. Further, the data terminal 12 is connected to the network N4 such as the Internet. The data terminal 12 and the relay server 14 cannot directly access the data process apparatus 10A or the individual devices 30A provided within a local network such as the network N1. Similarly, the data terminal 12 and the relay server 14 cannot directly access the data process apparatus 10B or the individual devices 30B provided within a local network such as the network N2.

On the other hand, the data process apparatus 10A and the individual devices 30A provided in the network N1 can directly access the data terminal 12 or the relay server 14 provided in the network N4. Similarly, the data process apparatus 10B and the individual devices 30B provided in the network N2 can directly access the data terminal 12 or the relay server 14 provided in the network N4.

For example, in a case where the data terminal 12 transmits a request to the relay server 14 in the data process system 1, the data process apparatus 10A receives the request by transmitting an inquiry for a to the relay server 14. Accordingly, in the data process system 1, the data process apparatus 10A can indirectly receive a request from the data terminal 12.

Further, in the data process system 1, in a case where the data process apparatus 10A transmits a response to the request to the relay server 14, the data terminal receives the response from the relay server 14. Accordingly, in the data process system 1, the data terminal 12 can indirectly receive a response from the data process apparatus 10A.

The network N3 (e.g., local network) is not connected to the network N4 (e.g., Internet). Therefore, the data process apparatus 10C provided in the network N3 cannot access the network N4 such as the Internet.

<Hardware Configuration>
<<Computer>>

Figure 3:
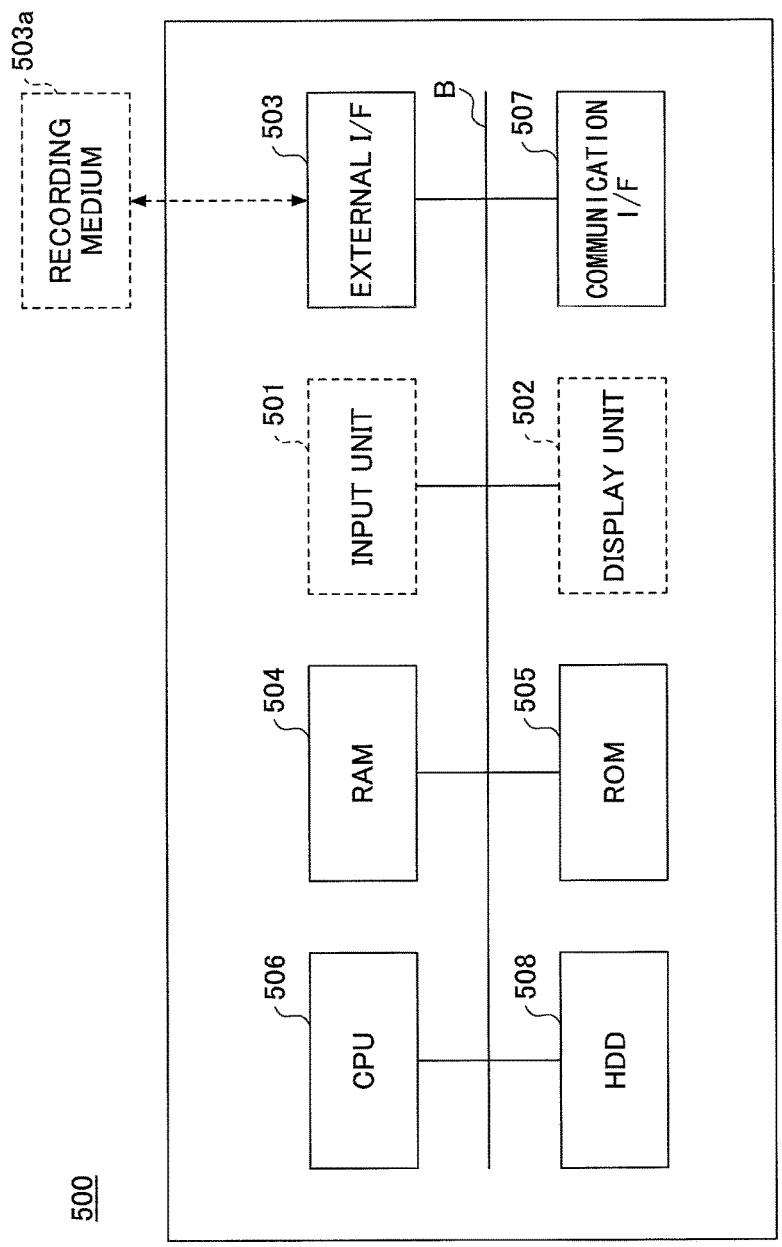
FIG. 3 is a schematic diagram illustrating a hardware configuration of a computer according to an embodiment of the present invention.

The data process apparatuses 10A to 10C and the relay server 14 are implemented by a computer, respectively. For example, the computer may have a hardware configuration illustrated in FIG. 3. FIG. 3 is a schematic diagram illustrating a hardware configuration of a computer 500 according to an embodiment of the present invention.

The computer 500 of FIG. 3 includes, for example, an input unit 501, a display unit 502, an external I/F 503, a RAM (Random Access Memory) 504, a ROM (Read Only Memory) 505, a CPU (Central Processing Unit) 506, a communication I/F 507, and a HDD (Hard Disk Drive) 508 that are connected to each other by a bus B. Note that the input unit 501 and the display unit 502 may be connected to the computer 500 only when needed for use.

The input unit 501 includes, for example, a keyboard, a mouse, and a touch panel. The input unit 501 is used to allow the user to input an operation signal. The display unit 502 includes, for example, a display device. The display unit 502 displays the results of processes performed by the computer 500.

The communication I/F 507 is an interface that connects the computer 500 to various networks. Accordingly, the computer 500 can perform data communication by way of the communication I/F 507.

The HDD 508 is an example of a non-volatile storage device that stores programs and data therein. The programs and data stored in the HDD 508 may include, for example, an OS serving as basic software for controlling the entire computer 500, and application software (hereinafter also referred to as "application") for providing various functions by way of the OS. Alternatively, the computer 500 may use a drive using a flash memory as a recording medium (e.g., SSD (Solid State Drive) instead of the HDD 508.

The external I/F 503 is an interface with an external device. The external device may be, for example, a recording medium 503a. Thereby, the computer 500 can read data from and/or write data to the recording medium 503a by way of the external I/F 503. The recording medium 503a may be, for example, a flexible disk, a CD (Compact Disc), a DVD (Digital Versatile Disc), an SD (Secure Digital) memory card, or a USB (Universal Serial Bus) memory.

The ROM 505 is an example of a non-volatile memory (storage device) that can retain programs and data even when electric power is turned off. For example, programs and data (e.g., (e.g., BIOS, OS settings, network settings) that are executed when the computer 500 is activated are stored in the ROM 505. The RAM 504 is an example of a volatile semiconductor memory (storage device) that temporarily stores programs and data therein.

The CPU 506 is an operation device that implements the controls and functions of the entire computer 500 by reading programs and data from storage devices such as the ROM 505 and the HDD 508, loading the programs and data to the RAM 504, and executing the processes of the program and data loaded to the RAM 504. Each of the data process apparatuses 10A to 10C and the relay server 14 can implement the below-described processes by using, for example, the hardware configuration illustrated in FIG. 3.

<<Data Terminal>>

Figure 4:
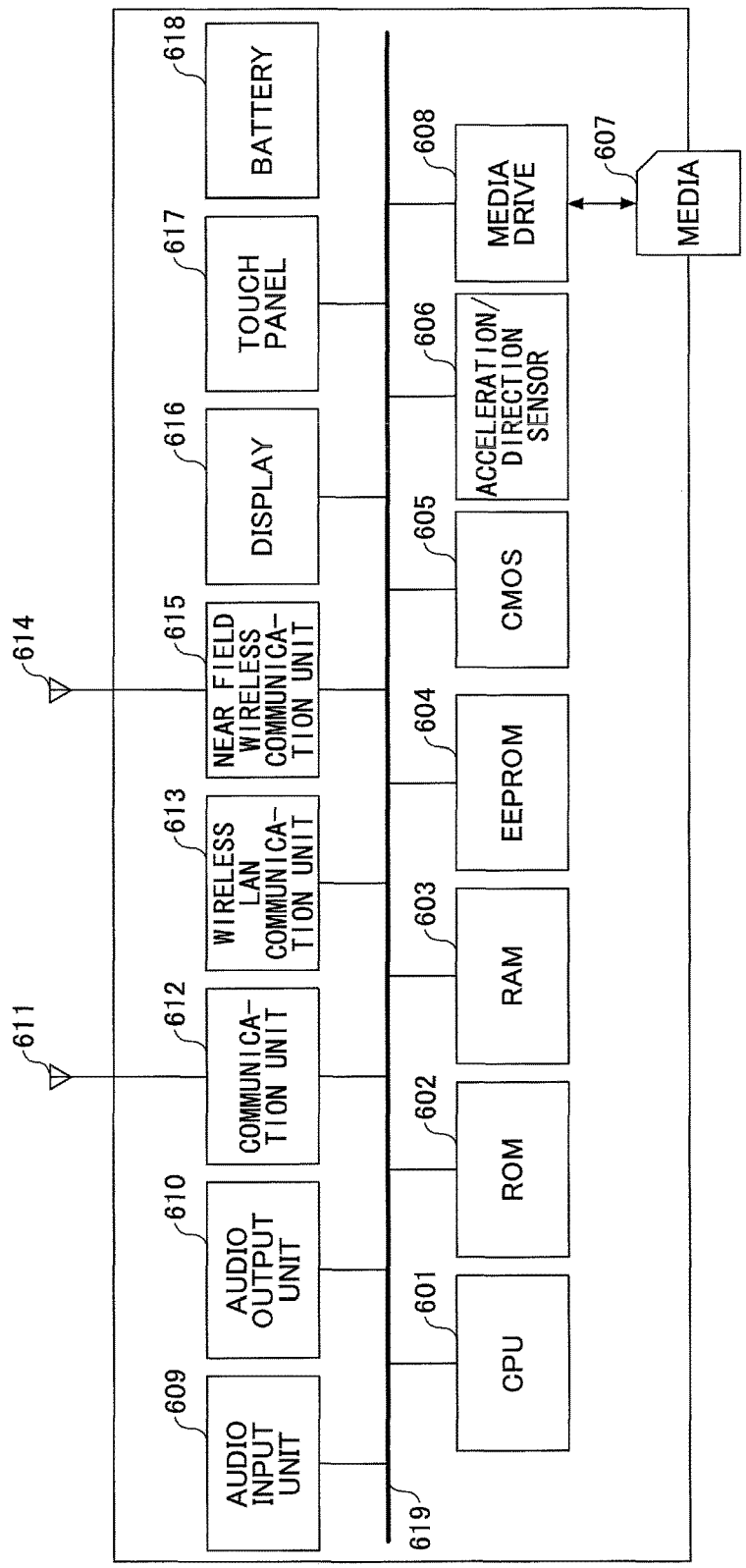
FIG. 4 is a hardware configuration of a data terminal according to an embodiment of the present invention.

The data terminal may be implemented by using, for example, a hardware configuration illustrated in FIG. 4. FIG. 4 is a hardware configuration of the data terminal 12 according to an embodiment of the present invention. The data terminal 12 of FIG. 4 includes, for example, a CPU 601, a ROM 602, a RAM 603, an EEPROM 604, a CMOS sensor 605, an acceleration/direction sensor 606, and a media drive 608.

The CPU 601 controls the entire operations of the data terminal 12. The ROM 602 stores basic input/output programs therein. The RAM 603 is used as a work area of the CPU 601. The EEPROM 604 reads data or writes data according to the control of the CPU 601. The CMOS sensor 605 photographs an object and obtains image data of the object according to the control of the CPU 601. The acceleration/direction sensor 606 may be, for example, an electromagnetic compass that detects geomagnetism, a gyro compass, or an acceleration sensor.

The media drive 608 controls the reading and writing (storage) of data performed on recording media 607 such as a flash memory. The recording media 607 can be detachably attached to the media drive 608, so that data recorded on the recording media 607 can be read out from the recording media 607 or data can be recorded and stored in the recording media 607.

The EEPROM 604 stores, for example, OS executed by the CPU 601 and association data required for setting a network. The applications for executing various processes of the data terminal 12 of this embodiment are stored in, for example, the EEPROM 604 or the recording media 607.

The CMOS sensor 605 is, for example, a CCD (Charge Coupled Device) that converts light into electric charges to digitize an image of an object. The CMOS sensor 605 may be other charge coupled devices as long as an object can be imaged.

The data terminal 12 includes an audio input unit 609, an audio output unit 610, an antenna 611, a communication unit 612, a wireless LAN communication unit 613, a near field wireless communication antenna 614, a near field wireless communication unit 615, a display 616, a touch panel 617, and a bus line 619.

The audio input unit 609 converts sound into audio signals. The audio output unit 610 converts audio signals into sound. The communication unit 612 uses the antenna 11 to communicate with a nearest base station apparatus by way of wireless communication signals. The wireless LAN communication unit 613 performs wireless LAN communication with an access point according to the IEEE 80411 standard. The near field wireless communication unit 615 uses the near field wireless communication antenna 614 to perform near field wireless communication.

The display 616 is, for example, a liquid crystal display or an organic electro luminescence (EL) display that display an image of an object, various icons or the like. The touch panel 617 is placed on the display 616 and constituted by a pressure-sensitive or electrostatic panel. The touch panel 617 that is touched with a finger, a touch pen or the like detects a touch position on the display 616. The bus line 619 may be, for example, an address bus or a data bus that is electrically connected to each of the above-described units of the data terminal 12.

The data terminal 12 includes a battery dedicated to the data terminal 12. The data terminal 12 is driven by the battery 618. Note that the audio input unit 609 includes a microphone into which audio is input. The audio output unit 610 includes a speaker that outputs audio.

With the above-described hardware configuration, the data terminal 12 can implement the following processes.

<Software Configuration>
<<Data Process Apparatus>>

Figure 5:
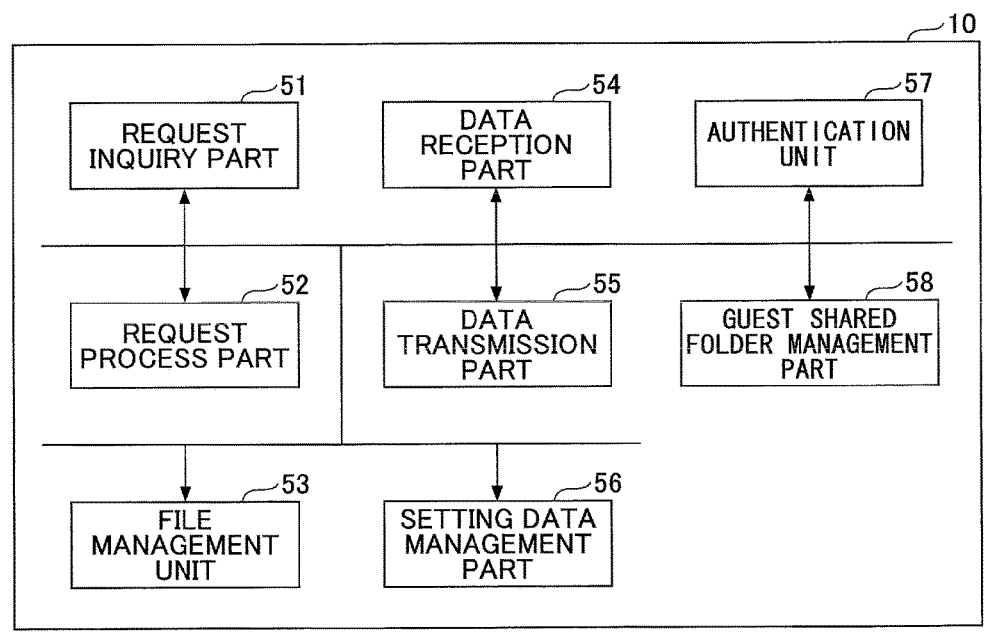
FIG. 5 is a functional block diagram of a data process apparatus according to an embodiment of the present invention.

Each of the data process apparatuses 10A to 10C according to an embodiment of the present invention is implemented by the functional blocks illustrated in FIG. 5. FIG. 5 is a functional block diagram of the data process apparatus 10 according to an embodiment of the present invention. Note that the data process apparatuses 10A to 10C are collectively referred to as "data process apparatus 10" when the data process apparatus 10 may be any one of the data process apparatuses 10A to 10C.

The data process apparatus 10 implements a request inquiry part 51, a request process part 52, a file management part 53, a data reception part 54, a data transmission part 55, a setting data management part 56, an authentication part 57, and a guest shared folder management part 58 by executing a program stored in, for example, the ROM 505 or the HDD 509.

The request inquiry part 51 inquires the relay server 14 if there are any requests. The request process part 52 processes the requests. The file management part 53 performs, for example, storage of received files and reading or stored files. The data reception part 54 receives data such as files and requests from other devices.

The data transmission part 55 transmits data such as files and process results of requests. The setting data management part 56 performs, for example, retaining of setting pertaining to the data process apparatus 10 and reading the retained settings. The authentication part 57 authenticates a connection request from the data terminal 12. The guest shared folder management part 58 creates a guest shared folder and manages access to the guest shared folder.

<<Relay Server>>

Figure 6:
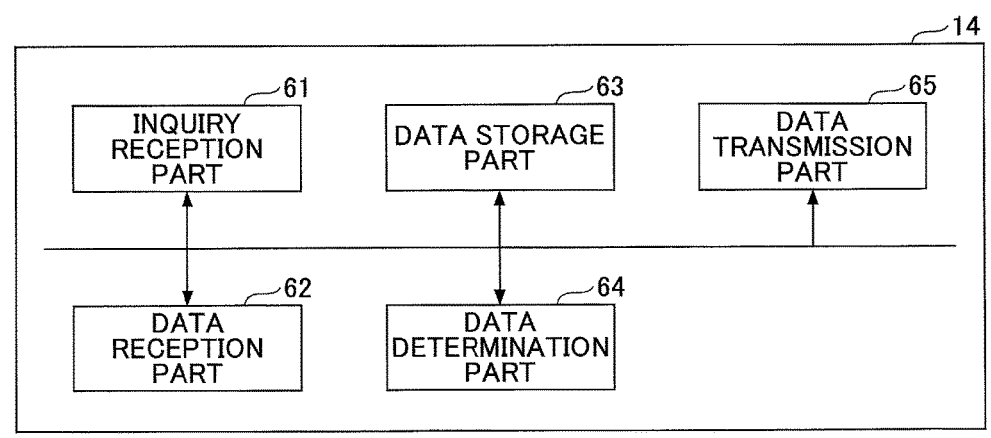
FIG. 6 is a functional block diagram of a relay server according to an embodiment of the present invention.

The relay server 14 according to an embodiment of the present invention is implemented by the functional blocks illustrated in FIG. 6. FIG. 6 is a functional block diagram of the relay server 14 according to an embodiment of the present invention. The relay server 14 implements an inquiry reception part 61, a data reception part 62, a data storage part 63, a data determination part 64, and a data transmission part 65 by executing a program stored in, for example, the ROM 505 or the HDD 509.

The inquiry reception part 61 receives inquiries from the data process apparatus regarding whether there are any requests. The data reception part 62 receives data transmitted from the data terminal 12, the ID of the data terminal 12 that has transmitted the data (ID of transmission source), and the ID of the data process apparatus 10 to which the data is transmitted (ID of transmission destination).

The data storage part 63 stores various data received by the data reception part 62. The data determination part 64 determines whether data associated with the ID of the data process apparatus 10 that has been inquired by the inquiry reception part 61 is stored in the data storage part 63. The data transmission part 65 transmits data stored in the data storage part 63 to the data process apparatus 10 that has made the inquiry.

<<Data Terminal>>

Figure 7:
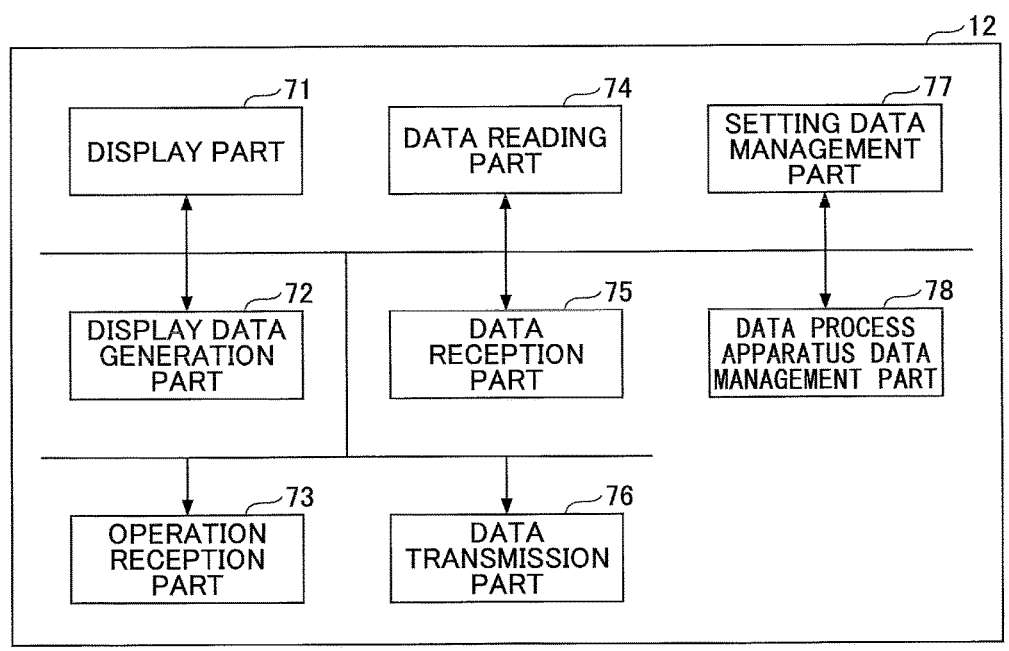
FIG. 7 is a functional block diagram of a data terminal according to an embodiment of the present invention.

The data terminal 12 according to an embodiment of the present invention is implemented by the functional blocks illustrated in FIG. 7. FIG. 7 is a functional block diagram of the data terminal 7 according to an embodiment of the present invention. The data terminal 12 implements a display part 71, a display data generation part 72, an operation reception part 73, a data reading part 74, a data reception part 75, a data transmission part 76, a setting data management part 77, and a data process apparatus data management part 78 by executing a program stored in, for example, the ROM 602, the EEPROM 604, or the recording media 607.

The display part 71 displays various data to the user. The display data generation part 72 generates, for example, images of the various data to be displayed by the display part 71. The operation reception part 73 receives operations by the user. The data reading part 74 reads data of, for example, two-dimensional codes or NFC (Near Field Communication) tags.

The data reception part 75 receives various data such as files. The data transmission part 76 transmits various data such as files. The setting data management part 77 stores the settings of the data terminal 12. The data process apparatus data management part 78 manages network data to be used for connecting with the data process apparatus 10.

<Details of Processes>

Next, details of the processes of the data process system 1 according to an embodiment of the present invention are described.

<<Regular Access Authentication>>

Figure 8:
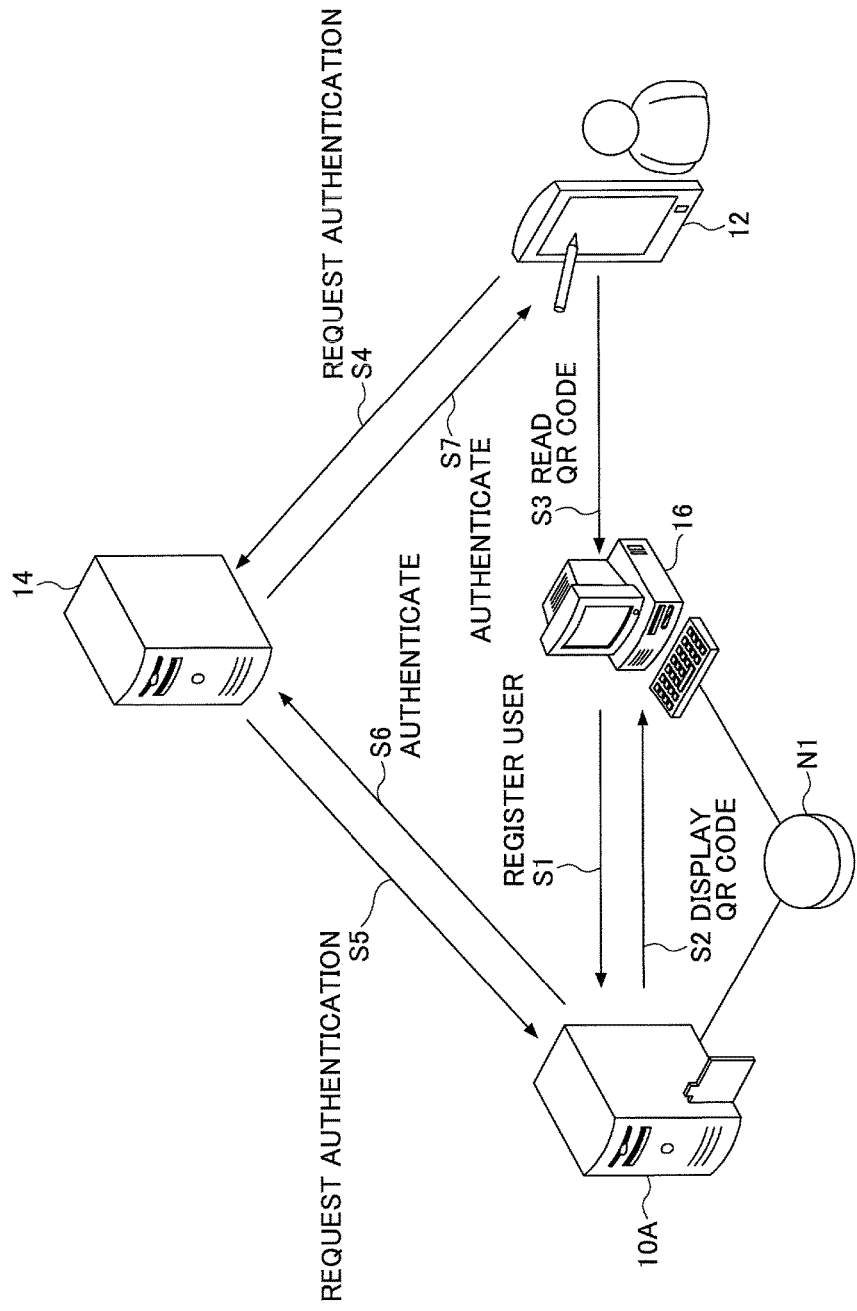
FIG. 8 is a schematic diagram illustrating an example of the procedures of a regular access authentication process according to an embodiment of the present invention.

In the data process system 1 according to an embodiment of the present invention, the data process apparatus 10A and the data terminal 12 perform a regular access authentication by, for example, the procedures illustrated in FIG. 8. FIG. 8 is a schematic diagram illustrating an example of the procedures of a regular access authentication process.

In order for a registered user to access the data process apparatus 10A with the data terminal 12 in the data process system 1 according to an embodiment of the present invention, an authentication process (e.g., user registration, device registration) is to be performed beforehand. In this example, authentication is performed by conducting user registration with a user ID and a password and conducting device authentication by using a two-dimensional code such as a QR code (registered trademark).

In Step S1, the user accesses the data process apparatus 10A with a PC 16 connected to the data process apparatus 10A via the network N1 and conducts user registration by registering a user ID and a password. Then, in Step S2, the PC 16 displays a QR code received from the data process apparatus 10A. The QR code includes data required for a registered user to access the data process apparatus 10A by way of the relay server 14.

In Step S3, device authentication is initiated when the user reads the QR code displayed on the PC 16. In Steps S4 and S5, the data terminal 12 requests device authentication to the data process apparatus 10A by way of the relay server 14. In response to the request, the data process apparatus 10A performs device authentication on the data terminal 12. In Steps S6 and S7, the data process apparatus 10A transmits the results of the device authentication to the data terminal 12 by way of the relay server 14 if the device authentication succeeds.

By performing the procedures of FIG. 8, the device terminal 12 being used by a registered user can access, for example, a registered user shared folder (shared folder for registered users) and a dedicated folder.

<<File Sharing with Guest Shared Folder>>

In the data process system 1 according to an embodiment of the present invention, the data terminals 12A, 12B can share files by using the below-described guest shared folder of the data process apparatus 10C that is not connected to the public network N4 (e.g., Internet).

Figure 9:
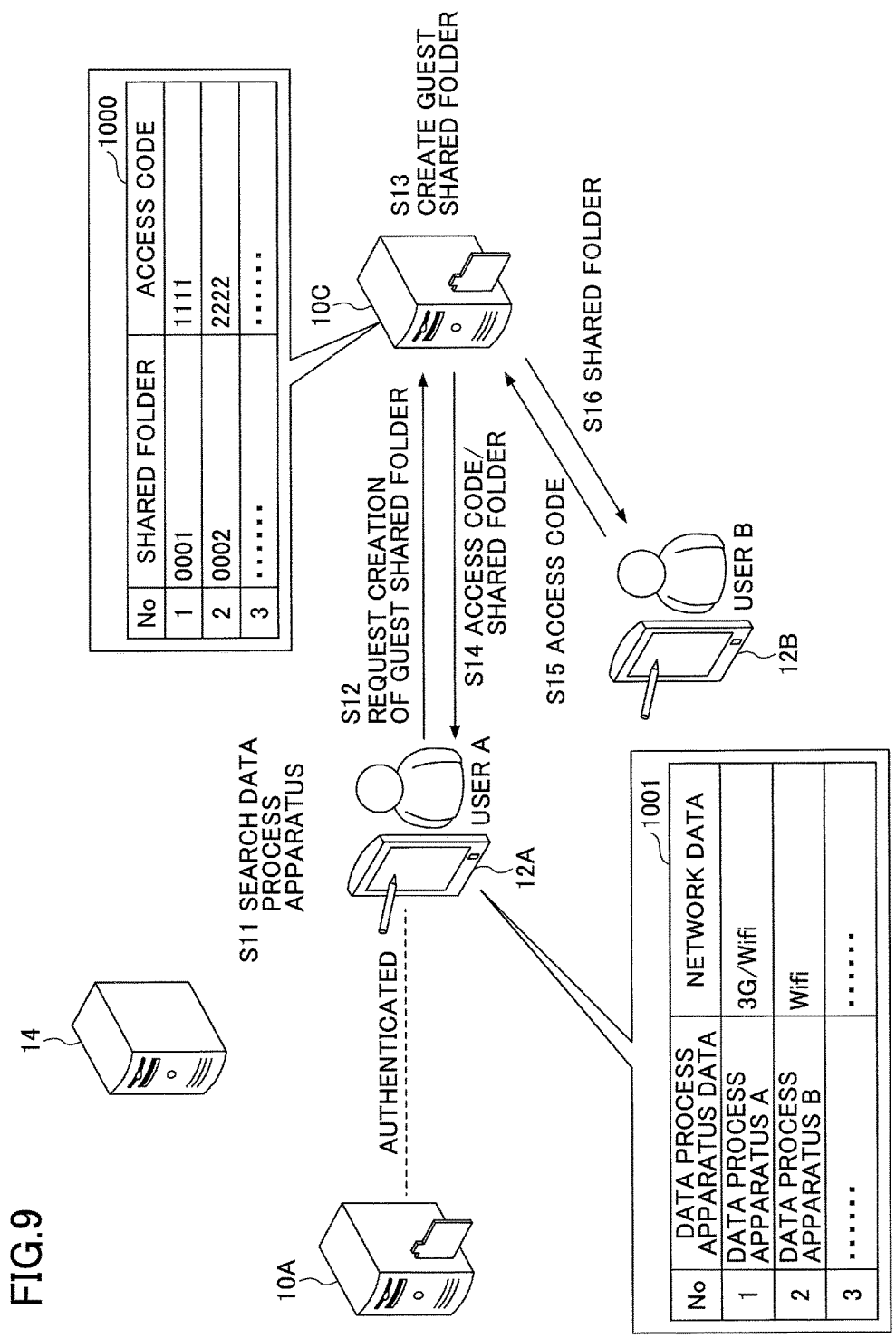
FIG. 9 is a schematic diagram illustrating an example of the procedures of performing a file sharing process with a guest shared folder according to an embodiment of the present invention.

FIG. 9 is a schematic diagram illustrating an example of the procedures of performing a file sharing process with the guest shared folder. As a premise of the example illustrated in FIG. 9, the data terminal 12A and the data process apparatus 10A are already authenticated by the regular access authentication process. Therefore, the data terminal 12A can indirectly transmit a request to the data process apparatus 10A by using a telephone line (e.g., 3G line) and connecting to the relay server 6 provided in the network N4 (e.g., Internet).

Further, the data process apparatus 10C is connected to the network N3 that is not connected to the network N4 (e.g., Internet). Although the data terminals 12A, 12B are connected to the same network N3 as the data process apparatus 10C, the data terminals 12A, 12B are not authenticated by the regular access authentication process illustrated in FIG. 8. In this state in the data process system 1 of this embodiment, the data terminals 12A, 12B can perform file sharing by using a guest shared folder (shared folder for guests) of the data process apparatus 10C.

In Step S11, the data terminal 12A searches for a data process apparatus 10 that is connected to the same network N3 as the data terminal 12A. The search for the data process apparatus 10 may be performed by, for example, designating an IP address, using a QR code, or performing near field wireless communication (e.g., NFC).

The data process apparatus 10C transmits a response to the data terminal 12A because the data process apparatus 10C is in the same network N3 as the data terminal 12A. It is, however, to be noted that the data process apparatus 10C does not transmits a response to the data terminal 12A even if the data process apparatus 10C and the data terminal 12A are connected to the same network N3 in a case where the network N3 is connected to the public network N4 (e.g., Internet). The data process apparatus 10C may determine that the data process apparatus 10C is connected to the public network N4 if the data process apparatus 10C can connect to the relay server 14.

The data process apparatus 10C may prepare a setting screen for inputting the settings for enabling file sharing by using the guest shared folder. Thereby, the user may operate on the setting screen and perform file sharing by using the guest shared folder.

In a case where the data terminal 12A receives a response resulting from the search, the data terminal 12A transmits a guest shared filed creation request to the data process apparatus 10C in Step S12. In Step S13, the data process apparatus 10C generates an access code upon receiving the guest shared folder generation request. Further, the data process apparatus 10C creates a guest shared folder corresponding to the access code. The data process apparatus 10C stores a corresponding relationship between the access code and the guest shared folder in a table 1000.

In Step S14, the data process apparatus 10C transmits data including the access code and the guest shared folder to the data terminal 12A in response to the guest shared folder generation request. At this point, the data terminal 12A can access the guest shared folder of the data process apparatus 10C.

A user "B" operating the data terminal 12B learns the access code from the user "A" using the data terminal 12A and inputs the access code into the data terminal 12B. In Step S15, the data terminal 12B designates the access code and transmits a guest shared folder obtaining request along with the designated access code to the data process apparatus 10C.

In Step S16, the data process apparatus 10C refers to the table 1000 and transmits the guest shared folder corresponding to the access code to the data terminal 12B in response to the guest shared folder obtaining request. Thereby, the data terminal 12B can access the guest shared folder of the data process apparatus 10C.

Accordingly, the unauthenticated data terminals 12A, 12B can perform file sharing by using the guest shared folder. Further, the data terminal 12A can switch access destinations from the data process apparatus 10C to authenticated data process apparatus 10A. For example, whether the data process apparatus 10A can be accessed by way of a telephone line (e.g., 3G line) may be displayed on the data terminal 12A. Accordingly, in the case where the data process apparatus 10A can be accessed by way of a telephone line, the data process apparatus 10A can always be selected. Further, whether the data process apparatus 10C which cannot be accessed by way of a telephone line (e.g., 3G line) is connected to the same network N3 as the data terminal 12A may be displayed on the data terminal 12A. Accordingly, in the case where the data process apparatus 10C is connected to the same network N3 as the data terminal 12A, the data process apparatus 10C can always be selected.

Figure 10:
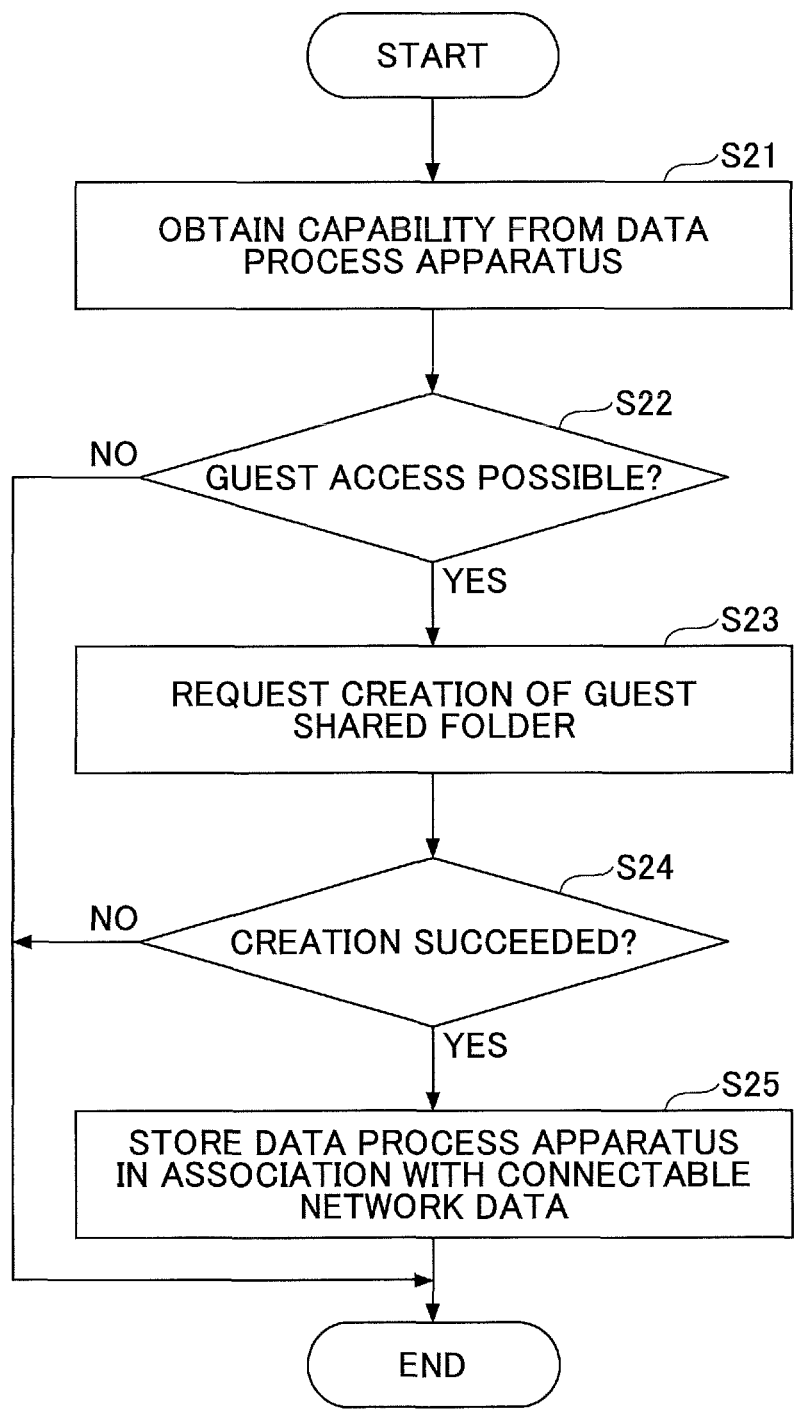
FIG. 10 is a flowchart illustrating an example of the procedures of a data terminal in a case of creating a guest shared folder according to an embodiment of the present invention.

The data terminal 12A transmits the guest shared folder by, for example, the procedures illustrated in FIG. 10. FIG. 10 is a flowchart illustrating an example of the procedures of the data terminal 12A in a case of creating the guest shared folder.

In Step S21, the data terminal 12A obtains capability data from the data process apparatus 10C. The data terminal 12A refers to the capability data and determines whether the data process apparatus 10C allows guest access. In Step S23, the data terminal 12A transmits a guest shared folder creation request to the data process apparatus 10C in a case where the data process apparatus 10C permits guest access. If the data process apparatus 10C does not permit guest access, the operation illustrated in the flowchart of FIG. 10 ends without the data terminal 12A transmitting the guest shared folder request to the data process apparatus 10C.

In a case where the creation of a guest shared folder in the data process apparatus 10C is a success in Step S24, the data terminal 12A proceeds to Step S25 in which the data terminal 12A associates the data of the data process apparatus 10C to the data of the network N3 and stores the associated data in, for example, a table 1001 in the ROM 602. The data terminal 12A can refer to the table 1001 and distinguish, for example, a telephone line used for accessing the data process apparatus 10A and a network N3 used for accessing the data process apparatus 10C.

If the creation of the guest shared folder in the data process apparatus 10C does not succeed, the operation illustrated in the flowchart of FIG. 10 ends without the data terminal 12A associating the data of the data process apparatus 10C and the data of the network N3 and storing the associated data in the table 1001.

Figure 11:
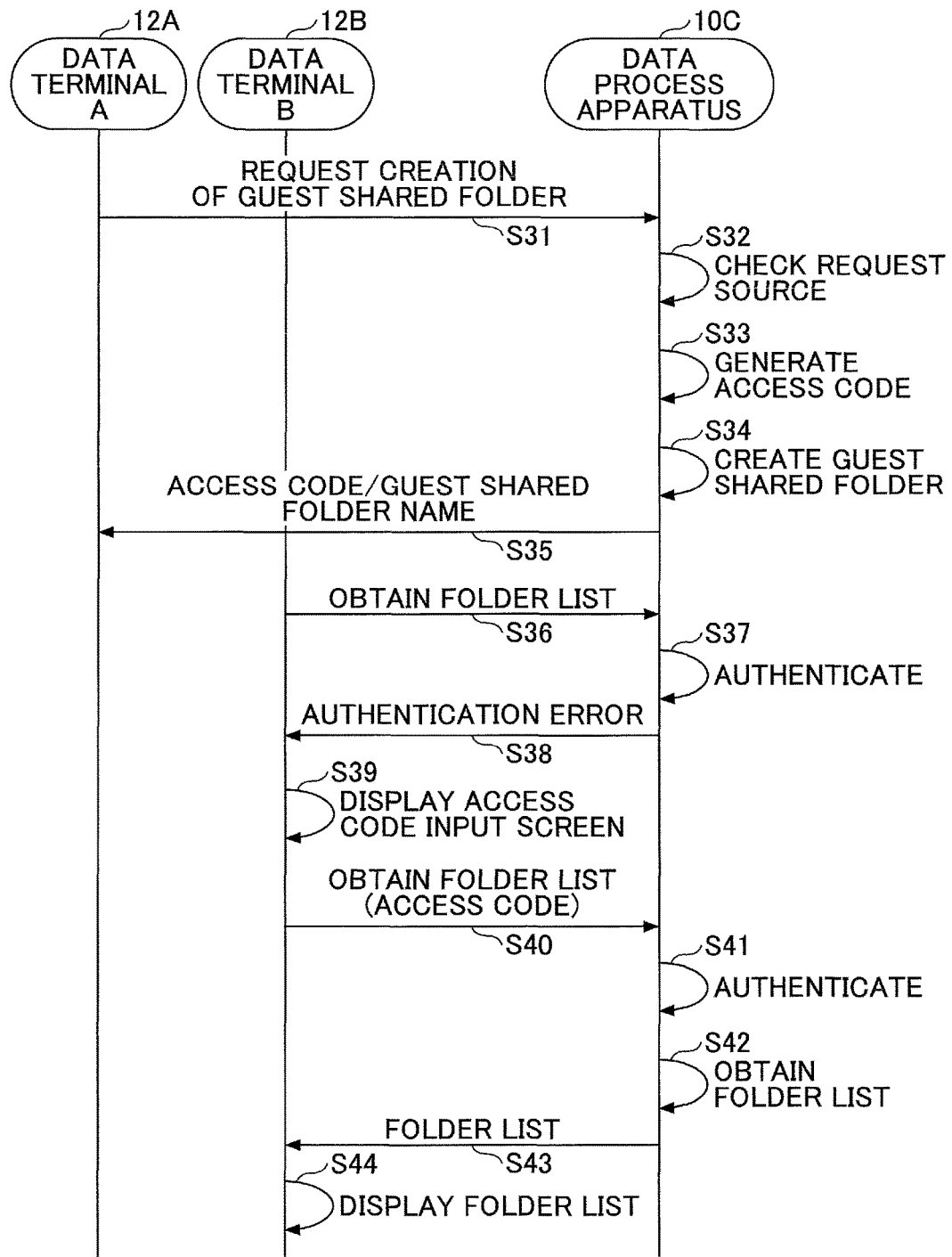
FIG. 11 is a sequence diagram illustrating the procedures of a file sharing process by using a guest shared folder according to an embodiment of the present invention.

In the data process system 1 according to an embodiment of the present invention, the guest shared folder is created and file sharing is performed by, for example, the procedures illustrated in FIG. 11. FIG. 11 is a sequence diagram illustrating the procedures of a file sharing process by using the guest shared folder.

In Step S31, the data terminal 12A transmits the guest shared folder creation request to the data process apparatus 10C. The data process apparatus 10C inspects the source (origin) of the guest shared folder creation request by referring to the IP address of the source of the guest shared folder creation request to determine whether the guest shared folder creation request is a request originating from the same network N3 or a request originating from the network N4 (e.g., Internet).

In a case where the guest shared folder creation request is from the same network N3 as the data process apparatus 10C, the data process apparatus 10C proceeds to Step S33 and generates an access code. In a case where the guest shared folder creation request is from a public network as the network N4 (e.g., Internet), the data process apparatus 10C ends the procedures illustrated in FIG. 11.

In Step S34, the data process apparatus 10C creates the guest shared folder corresponding to the access code. In Step S35, the data process apparatus 10C transmits data including the access code and the name of the guest shared folder to the data terminal 12A in response to the guest shared folder creation request.

Alternatively, the guest shared folder creation request of Step S31 may be a request to create a guest user (guest user creation request). In this case, the data process apparatus 10C receives a user name and a password from the data terminal 12A and creates a guest shared folder for a specific guest user. Similar to the above-described case of permitting access to the guest shared folder when the access code is correct, the data process apparatus 10C associates the access code and the guest shared folder and manages the associated data.

Then, in Step S36, the data terminal 12B transmits a folder list obtaining request to the data process apparatus 1 for obtaining a folder list. In Step S37, the data process apparatus 10C performs an authentication process for determining whether the data terminal 12B is authenticated. In Step S38, the data process apparatus 10C transmits an authentication error notice in response to the folder list obtaining request when the data process apparatus 10C determines that the data terminal 12B is not authenticated yet. The data process apparatus 10C transmits a folder list to the data terminal 12B in response to the folder list obtaining request when the data process apparatus 10C determines that the data terminal 12B is authenticated.

Note that, in Step S38, the data process apparatus 10C also transmits data indicating the existence of a guest shared folder to the data terminal 12B together with the authentication error notice. In Step S39, the data terminal 12B displays an access code input screen upon receiving the data indicating the existence of the guest shared folder. Thereby, the user B operating the data terminal 12B inputs the access code learned from the user A into the access code input screen.

In Step S40, the data terminal 12B designates the access code input into the access code input screen by the user and transmits a folder list obtaining request including the designated access code to the data process apparatus 10C. In Step S41, the data process apparatus 10C performs an authentication process by using the designated access code.

In Step S42, the data process apparatus 10C obtains a folder list of the guest shared folder corresponding to the designated access code when the authentication process succeeds by using the designated access code. In Step S43, the data process apparatus 10C transmits the folder list to the data terminal 12B in response to the folder list obtaining request. In Step S44, the data terminal 12B displays the folder list of the guest shared folder.

Accordingly, the data terminal 12B can access the guest shared folder of the data process apparatus 10C that is created in response to the guest shared folder creation request of the data terminal 12A. Note that the data process apparatus 10C may store the date and time of creating the guest shared folder, so that the data process apparatus 10C can automatically delete the guest shared folder after a predetermined period has elapsed. The period for automatically deleting the guest shared folder may be designated by the user by way of a Web UI. Alternatively, the data process apparatus may delete the guest shared folder at the timing of receiving a request to delete the guest shared folder from the data terminal 12A.

<<Projection Process Using Guest Shared Folder>>

Figure 12:
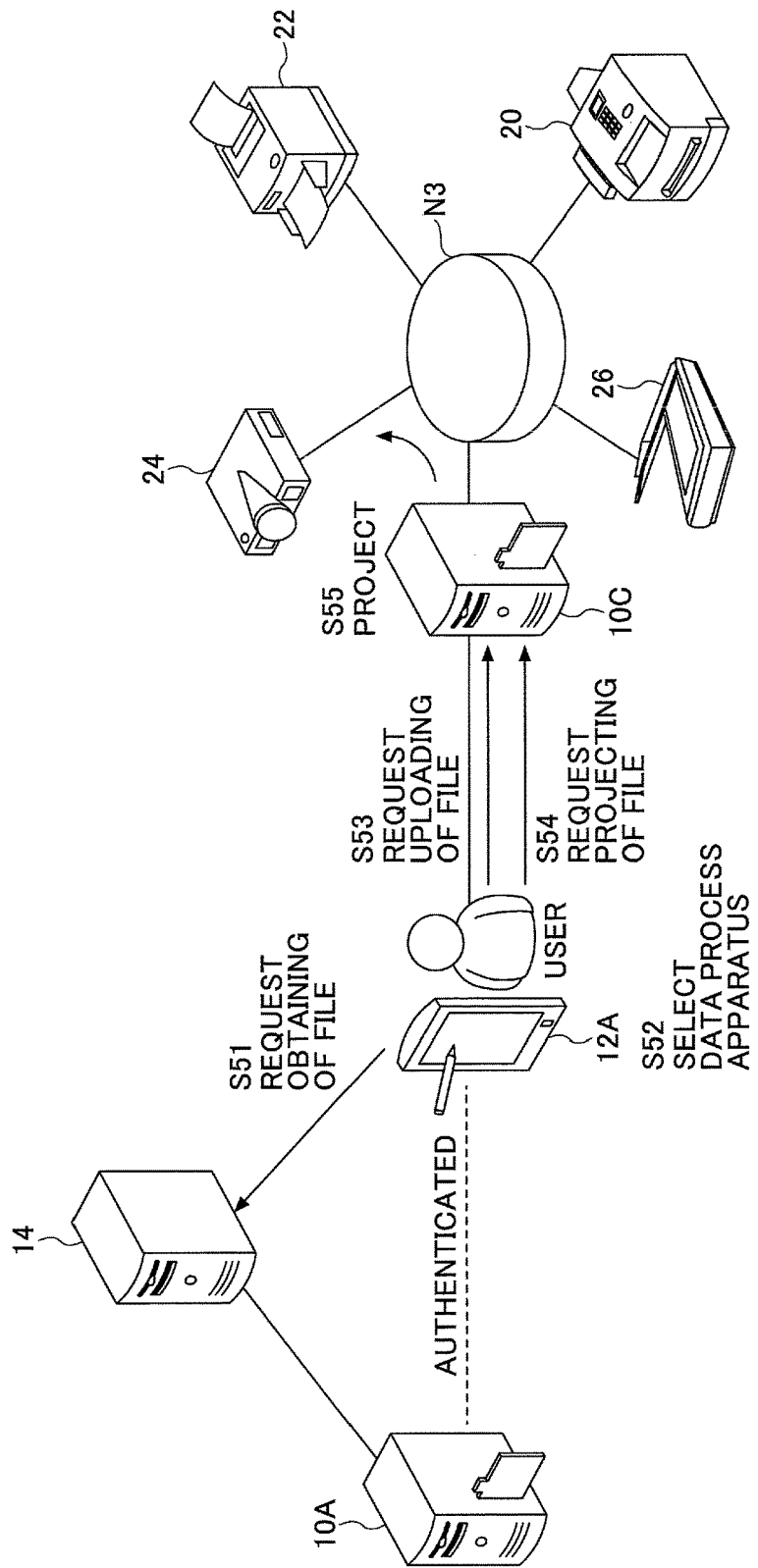
FIG. 12 is a schematic diagram illustrating the procedures of a projection process using a guest shared folder according to an embodiment of the present invention.

In the data process system 1 according to an embodiment of the present invention, the data terminal 12A may use the guest shared folder of the data process apparatus 10C to perform a projection process with the projector 24 connected to the same network N3 as the data process apparatus 10C. FIG. 12 is a schematic diagram illustrating the procedures of a projection process using a guest shared folder according to an embodiment of the present invention.

As a premise of the example illustrated in FIG. 12, the data terminal 12A and the data process apparatus 10A are already authenticated by the regular access authentication process depicted in FIG. 8. Therefore, the data terminal 12A can indirectly transmit a request to the data process apparatus 10A by using a telephone line (e.g., 3G line) to connect with the relay server 14 provided in the network N4 (e.g., Internet).

Further, the data process apparatus 10C and the projector 24 are connected to the network N3 that is not connected to the network N4 (e.g., Internet). Although the data terminal 12A is connected to the same network N3 as the data process apparatus 10C, the data terminal 12A is not authenticated by the regular access authentication process illustrated in FIG. 8.

Further, the data terminal 12A can access the guest shared folder by completing the process illustrated in FIG. 9. Under these conditions, the data process apparatus 10C in the data process system 1 can instruct the projector 24 to project a file stored in the data process apparatus 10A.

First, in Step S51, the data terminal 12A transmits a file obtaining request to the data process apparatus 10A by way of the relay server 14 and obtains the file stored in the data process apparatus 10A via the relay server 14. The data terminal 12A stores the obtained file therein. In Step S52, the user "A" operates the data terminal 12A to switch an access destination from the data process apparatus 10A to the data process apparatus 10C and instruct the data process apparatus 10C to upload the obtained file to the guest shared folder of the data process apparatus 10C.

In Step S53, the data terminal 12A transmits a request to the data process apparatus 10C for uploading the file obtained in Step S51 to the guest shared folder and uploads the file to the guest shared folder. In Step S54, the user "A" operates the data terminal 12A to request the projector 24 to project the uploaded file. In Step S55, the data process apparatus 10C reads the file uploaded to the guest shared folder and instructs the projector 24 to project the file read from the guest shared folder.

Accordingly, with the data process system 1 according to the first embodiment, the file stored in the authenticated data process apparatus 10A can be projected by the projector 24 that is not connected to the public network N4 (e.g., Internet). Further, the data terminal 12A may instruct the data process apparatus 10C to automatically delete the uploaded file or delete the uploaded file after a predetermined period has elapsed. Further, the data terminal 12A may instruct the data process apparatus 10C to automatically delete a file that could not be uploaded.

<<Screen Transition>>

Figure 13:
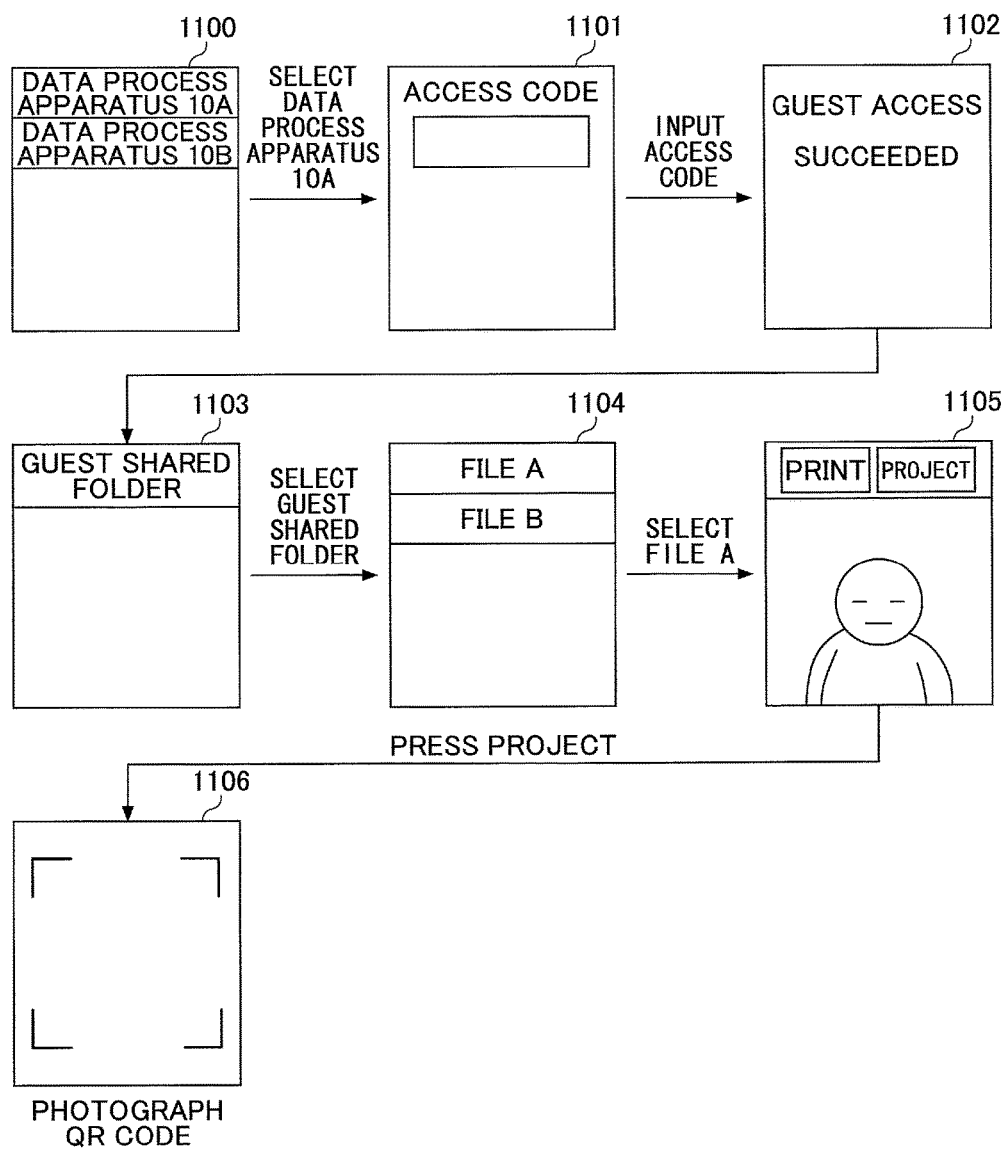
FIG. 13 is a schematic diagram illustrating an example of the transitions of the screens of a data terminal according to an embodiment of the present invention.

In the data process system according to an embodiment of the present invention, the screens that are displayed on the data terminal 12A when the projection process is performed by using the guest shared folder may make the transitions illustrated in FIG. 13. FIG. 13 is a schematic diagram illustrating an example of the transitions of the screens of the data terminal 12A.

The data terminal 12A refers to the table 1001 and displays selectable data process apparatuses 10A, 10C on an access destination selection screen 1100 in a manner that the data process apparatuses 10A, 10C can be selected by a user. In a case where the user selects the data process apparatus 10A, the data terminal 12A displays an access code input screen 1101 as illustrated in FIG. 11. Accordingly, the user "A" operating the data terminal 12A inputs an access code to the access code input screen 1101.

The data process apparatus 10A performs authentication with the access code input to the access code input screen 1101. When the authentication succeeds, the data process apparatus 10A allows the data terminal 12A to display an authentication success screen 1102 indicating the success of a guest access process. Further, the data process apparatus 10A allows the data terminal 12A to display a folder selection screen 1103 enabling selection of a guest shared folder corresponding to the access code.

When the user selects a guest shared folder, the data process apparatus 10A allows the data terminal 12A to display a file list screen 1104 stored in the selected guest shared folder. Then, the data terminal 12A makes a transition of displaying the file list screen 1104 to a file image display screen 1105 when the user selects "file A" from the file list screen 1104. Accordingly, an image of "file A" selected from the file list screen 1104 is displayed on the file image display screen 1105.

Further, a QR code photographing screen 1106 is displayed on the data terminal 12A when the user presses a photograph button provided on the file image display screen 1105. Accordingly, the user can select the projector 24 that is to project the "file A" with the QR code displayed on the QR code photographing screen 1106.

Second Embodiment

Figure 14:
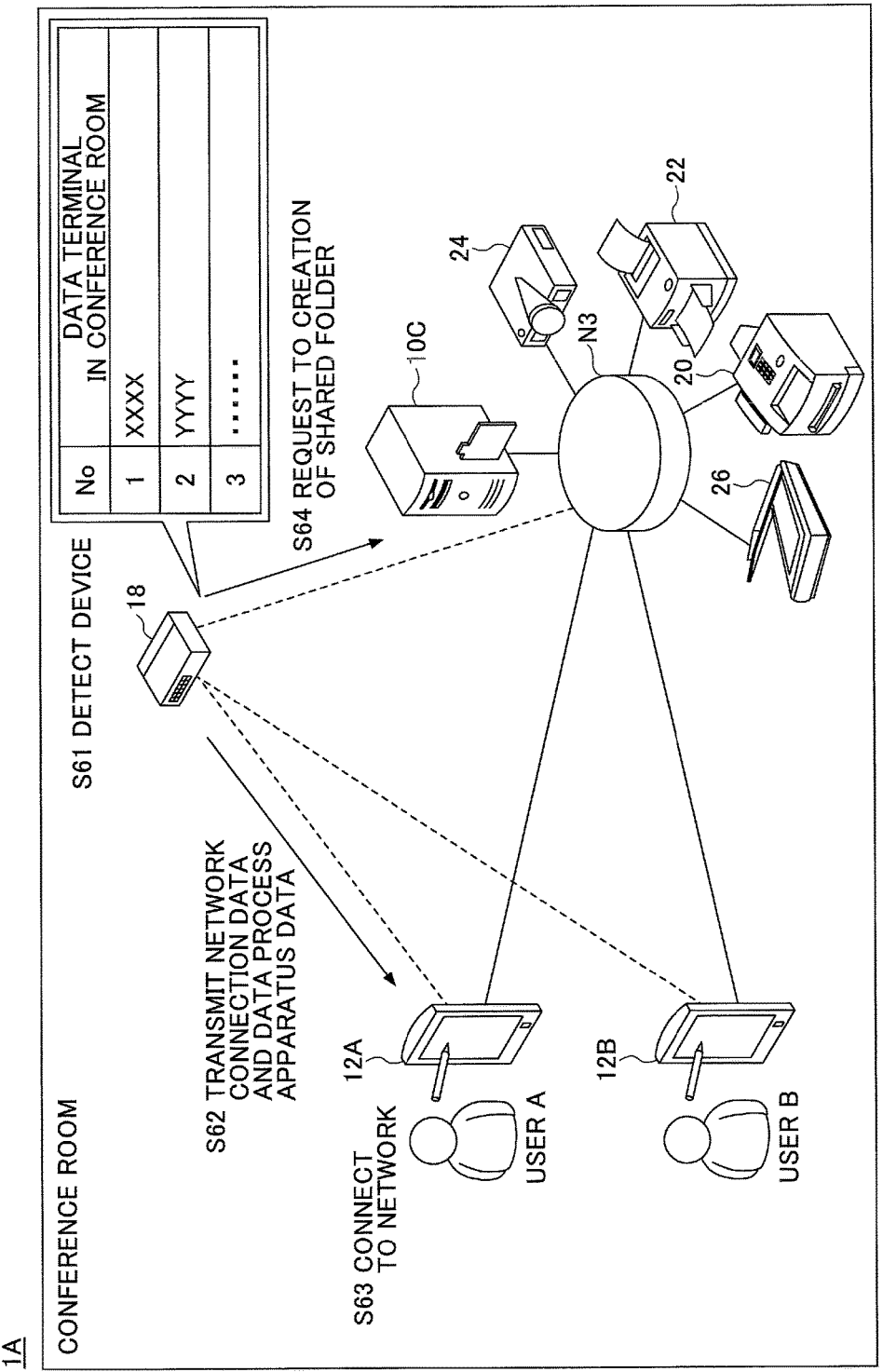
FIG. 14 is a schematic diagram illustrating another example of the procedures of performing a file sharing process with a guest shared folder according to an embodiment of the present invention.

A data process system 1A according to the second embodiment of the present invention has an intermediary device 18 added to the data process system 1 of the first embodiment. Because the data process system 1A of the second embodiment is substantially the same as the data process system 1 of the first embodiment except for a portion of the data process apparatus 1A, some of the description regarding the data process system 1A is omitted. FIG. 14 is a schematic diagram illustrating another example of the procedures of performing a file sharing process with the guest shared folder.

As a premise of the example illustrated in FIG. 14, the intermediary device 18 can perform near field wireless communication with a wireless access point. The near field wireless communication is performed by, for example, Bluetooth communication. The communication distance of the intermediary device 18 is set to be a range (e.g., less than or equal to a few meters), so that the intermediary device 18 can detect the data terminals 12A, 12B in a conference room.

In Step S61, the intermediary device 18 detects the data terminal 12A when the user "A" carrying the data terminal 12A enters the conference room. The intermediary device 18 periodically performs a presence confirmation process for determining whether the detected data terminal 12A is present in the conference room and manages the number of data terminals 12 in the conference room. In Step S62, the intermediary device 18 transmits data for connecting to the network N3 by way of a wireless LAN and data including an IP address of the data process apparatus 10C to the detected data terminal 12A.

The data terminal 12A connects with the network N3 by using the data for connecting to the network N3 by way of a wireless LAN. When the number of intermediary devices 18 detected in the conference room by the intermediary device 18 changes from none to one or more, the intermediary device 18 transmits a guest shared folder creation request to the data process apparatus 10C for creating a guest shared folder in the data process apparatus 10C. Therefore, a guest shared folder is created in the data process apparatus 10C in a case where a data terminal 12 is present in the conference room.

Then, the data terminal 12B connects with the network N3 by way of a wireless LAN in a similar manner as the above-described process performed by the data terminal 12A when the user "B" carrying the data terminal 12B enters the conference room. Accordingly, the data terminal 12B can access the guest shared folder of the data process apparatus 10C.

In a case where both the user "A" carrying the data terminal 12A and the user "B" carrying the data terminal 12B have exited the conference room such that data terminals 12 are no longer detected in the conference room, the intermediary device 18 transmits a guest shared folder deletion request to the data process apparatus 10C for deleting the guest shared folder.

In the data process system 1A illustrated in FIG. 14, a user carrying a data terminal 12 can share a file with other users when the user enters the conference room. Further, when the intermediary device 18 detects no data terminals 12 in the conference room, the guest shared folder may be automatically deleted as illustrated in FIG. 14. Thereby, file sharing can be securely performed.

Figure 15:
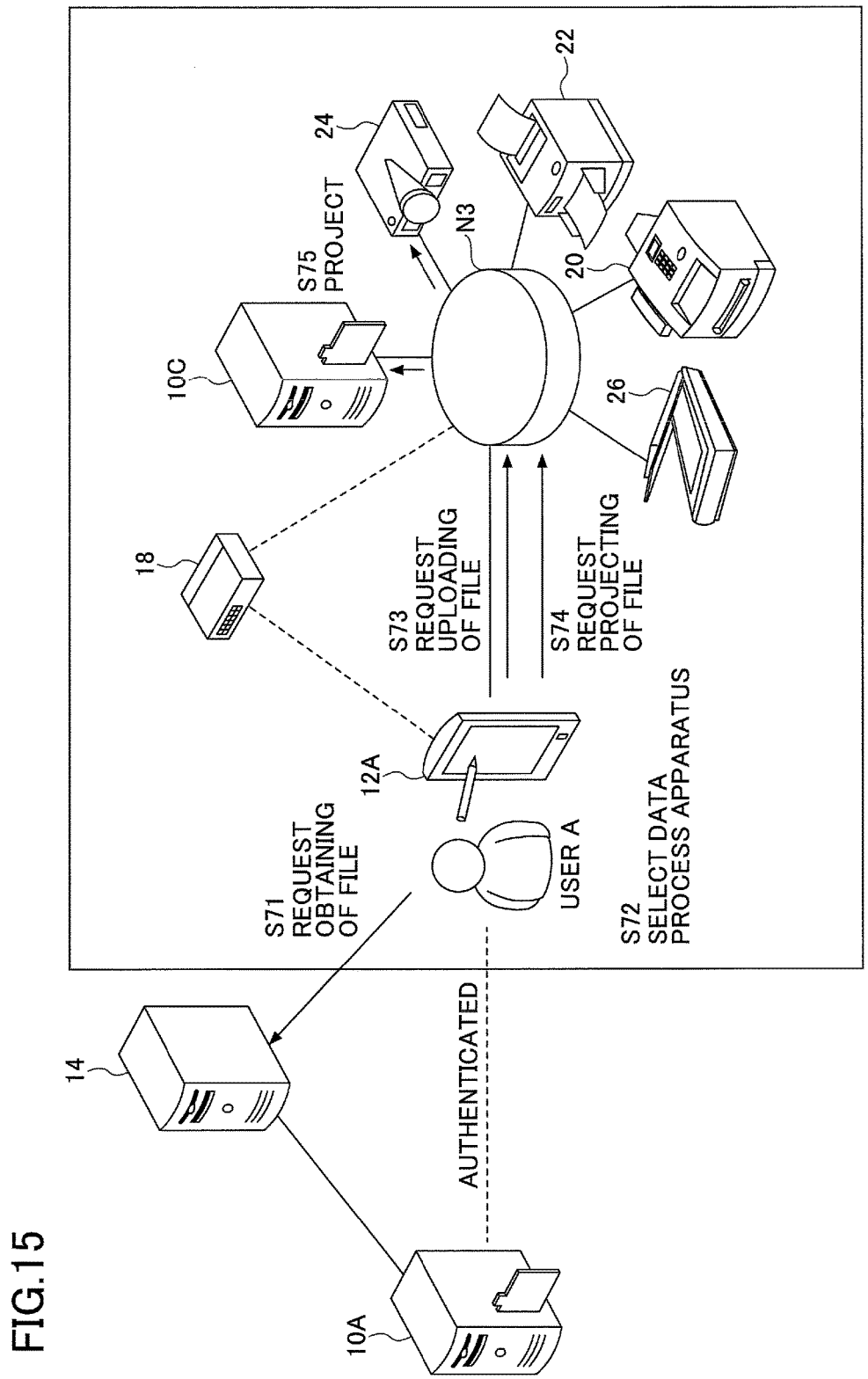
FIG. 15 is a schematic diagram illustrating the procedures of a projection process using a guest shared folder according to an embodiment of the present invention.

In the data process system 1A according to an embodiment of the present invention, the data terminal 12A may use the guest shared folder of the data process apparatus 10C to perform a projection process with the projector 24 connected to the same network N3 as the data process apparatus 10C. FIG. 15 is a schematic diagram illustrating the procedures of a projection process using a guest shared folder according to an embodiment of the present invention.

As a premise of the example illustrated in FIG. 15, the data terminal 12A and the data process apparatus 10A are already authenticated by the regular access authentication process depicted in FIG. 8. Therefore, the data terminal 12A can indirectly transmit a request to the data process apparatus 10A by using a telephone line (e.g., 3G line) to connect with the relay server 14 provided in the network N4 (e.g., Internet).

Further, the data process apparatus 10C and the projector 24 are connected to the network N3 that is not connected to the network N4 (e.g., Internet). Although the data terminal 12A is connected to the same network N3 as the data process apparatus 10C, the data terminal 12A is not authenticated by the regular access authentication process illustrated in FIG. 8.

Further, the data terminal 12A can access the guest shared folder by completing the process illustrated in FIG. 14. Under these conditions, the data process apparatus 10C in the data process system 1A can instruct the projector 24 to project a file stored in the data process apparatus 10A.

First, in Step S71, the data terminal 12A transmits a file obtaining request to the data process apparatus 10A by way of the relay server 14 and obtains the file stored in the data process apparatus 10A via the relay server 14. The data terminal 12A stores the obtained file therein. In Step S72, the user "A" operates the data terminal 12A to switch an access destination from the data process apparatus 10A to the data process apparatus 10C and instruct the data process apparatus 10C to upload the obtained file to the guest shared folder of the data process apparatus 10C.

In Step S73, the data terminal 12A transmits a request to the data process apparatus 10C for uploading the file obtained in Step S71 to the guest shared folder and uploads the file to the guest shared folder. In Step S74, the user "A" operates the data terminal 12A to request the projector 24 to project the uploaded file. In Step S75, the data process apparatus 10C reads the file uploaded to the guest shared folder and instructs the projector 24 to project the file read from the guest shared folder.

Accordingly, with the data process system 1A according to the second embodiment, the file stored in the authenticated data process apparatus 10A can be projected by the projector 24 that is not connected to the public network N4 (e.g., Internet). Further, the data terminal 12A may instruct the data process apparatus 10C to automatically delete the uploaded file or delete the uploaded file after a predetermined period has elapsed. Further, the data terminal 12A may instruct the data process apparatus 10C to automatically delete a file that could not be uploaded.

CONCLUSION

With the data process system 1 or the process system 1A according to the above-described embodiments, unregistered users can share files by using the data process apparatus 10C by way of an unregistered data terminal 12.

Further, with the data process system 1 or the data process system 1A according to the above-described embodiments, the data process apparatus 10C creates a-guest shared folder in a case where the data process apparatus 10C is connected to a local network N3 that is not connected to a public network N4 (e.g., Internet). Accordingly, the data terminal 12 permitted to access the guest shared folder is limited to data terminals 12 that can connect with the local network N3. Therefore, folder sharing can be securely performed.

For example, in a case where a conference is held in a rental office of an outside facility, the members of the conference can securely share files by using the data process apparatus 10 provided in the rental office.

Further, with the data process system 1 or the data process system 1A according to the above-described embodiments, a user can carry the data terminal 12 into a conference room and share files with other users. Further, with the data process system 1 or the data process system 1A according to the above-described embodiments, the guest shared folder can be automatically deleted when a data terminal 12 is no longer detected in the conference room. Therefore, file sharing can be securely performed.

The present invention is not limited to the specifically disclosed embodiments, and variations and modifications may be made without departing from the scope of the present invention.

The access code is an example of access data indicating authorization for accessing a data storage space. The guest shared folder management part 58 is an example of a unit that manages a data storage space (data storage management part). The authentication part 57 is an example of a unit that performs authentication (authentication unit). The request process part 52 is an example of a unit that processes a request (request process unit).

The intermediary device 18 is an example of an intermediary device that detects whether a data terminal has entered a predetermined area and transmits data for enabling a detected data terminal to transmit an access request to a data process apparatus. Each of the multifunction peripheral 20, the printer 22, the projector 24, and the scanner 26 is an example of an electronic device.

The present application is based on and claims the benefit of priority Japanese Priority Application No. 2015-056206 filed on Mar. 19, 2015, with the Japanese Patent Office, the entire contents of which are hereby incorporated by reference.

What is claimed is:
1. A data process apparatus comprising:
a processor that is configured to:
receive a creation request for creating a sharable data storage space from an unauthenticated data terminal that is not authenticated to access the sharable data storage via a first authentication route and transmit a response to the unauthenticated data terminal, the response including access data indicating authorization for accessing the sharable data storage space via a second authentication route that is different from the first authentication route and data indicating the sharable data storage created in association with the access data;
authenticate the access data when the data process apparatus receives an access request including a designation of the access data for accessing the shared data storage space from an unauthenticated data terminal connected to a same network as the data process apparatus;
receive the access request from the unauthenticated data terminal when the authentication of the access data succeeds and perform a predetermined process in accordance with the access request, and
automatically generate the access data including an access code for each sharable data storage space and transmit the response including the access data in response to the creation request from the unauthenticated data terminal the access,
wherein the data process apparatus has a table in which the access data including the access code is managed in association with said each shareable data storage.
2. The data process apparatus as claimed in claim 1, wherein the processor is further configured to generate the access data indicating authorization for accessing the sharable data storage space and create the sharable data storage space allowed to be accessed by the unauthorized data terminal when the data process apparatus receives the access request including a designation of the access data.

3. The data process apparatus as claimed in claim 1, wherein the processor does not transmit the response to the unauthenticated data terminal when the data process apparatus is connected to a public network.

4. The data process apparatus as claimed in claim 1, wherein the processor is further configured to delete the shared data storage space when a predetermined period elapses.

5. The data process apparatus as claimed in claim 1,
wherein the processor is configured to receive the creation request from the unauthorized data terminal when an intermediary device detects the unauthorized data terminal entering a predetermined area;
wherein the intermediary device is configured to detect a data terminal that has entered the predetermined area and transmit data for enabling the detected data terminal to transmit the creation request to the data process apparatus.

6. The data process apparatus as claimed in claim 5,
wherein the processor is further configured to receive a deletion request from the intermediary device for deleting the sharable data storage space when no data terminal is detected in the predetermined area.

7. A method for sharing data with a data processing apparatus, the method comprising:
receiving a creation request for creating a sharable data storage space from an unauthenticated data terminal;
transmitting a response to the unauthenticated data terminal that is not authenticated to access the sharable data storage via a first authentication route, the response including access data indicating authorization for accessing the sharable data storage space via a second authentication route that is different from the first authentication route and data indicating the sharable data storage created in association with the access data;
authenticating the access data when the data process apparatus receives an access request including a designation of the access data for accessing the shared data storage space from an unauthenticated data terminal connected to a same network as the data process apparatus;
receiving the access request from the unauthenticated data terminal when the authentication of the access data succeeds;
performing a predetermined process in accordance with the access request,
automatically generating the access data including an access code for each sharable data storage space and transmitting the response including the access data in response to the creation request from the unauthenticated data terminal the access, and
managing the access data including the access code in association with said each shareable data storage in a table provided to the data processing apparatus.

8. The method as claimed in claim 7,
further comprising:
generating the access data indicating authorization for accessing the sharable data storage space; and
creating the sharable data storage space allowed to be accessed by the unauthorized data terminal when the data process apparatus receives the access request including a designation of the access data.

9. The method as claimed in claim 7,
wherein the response to the unauthenticated data terminal is not transmitted when the data process apparatus is connected to a public network.

10. The method as claimed in claim 7, further comprising:
deleting the shared data storage space when a predetermined period elapses.

11. The method as claimed in claim 7,
further comprising:
receiving the creation request from the unauthorized data terminal when an intermediary device detects the unauthorized data terminal entering a predetermined area; and
transmitting data for enabling the detected unauthorized data terminal to transmit the creation request to the data process apparatus.

12. The method as claimed in claim 11,
further comprising: receiving a deletion request from the intermediary device for deleting the sharable data storage space when no data terminal is detected in the predetermined area.

13. A data process system comprising:
at least one data terminal;
a data process apparatus that receives requests from the at least data terminal; and
an electronic device controlled by the data process apparatus;
wherein the data process apparatus includes
a processor that is configured to:
receive a creation request for creating a sharable data storage space from an unauthenticated data terminal that is not authenticated to access the sharable data storage via a first authentication route and transmit a response to the unauthenticated data terminal, the response including access data indicating authorization for accessing the sharable data storage space via a second authentication route that is different from the first authentication route and data indicating the sharable data storage created in association with the access data,
authenticate the access data when the data process apparatus receives an access request including a designation of the access data for accessing the shared data storage space from an unauthenticated data terminal connected to a same network as the data process apparatus,
receive the access request from the unauthenticated data terminal when the authentication of the access data succeeds and perform a predetermined process in accordance with the access request, and
automatically generate the access data including an access code for each sharable data storage space and transmit the response including the access data in response to the creation request from the unauthenticated data terminal the access,
wherein the data process apparatus has a table in which the access data including the access code is managed in association with said each shareable data storage.

* * * * *